April 25, 1967   M. L. CLEVETT, JR., ETAL   3,315,935
MOVABLE VEHICLE SEAT CONSTRUCTION, ANCHORING
MEANS AND BELT ASSEMBLY THEREFOR
Filed March 18, 1965   4 Sheets-Sheet 3
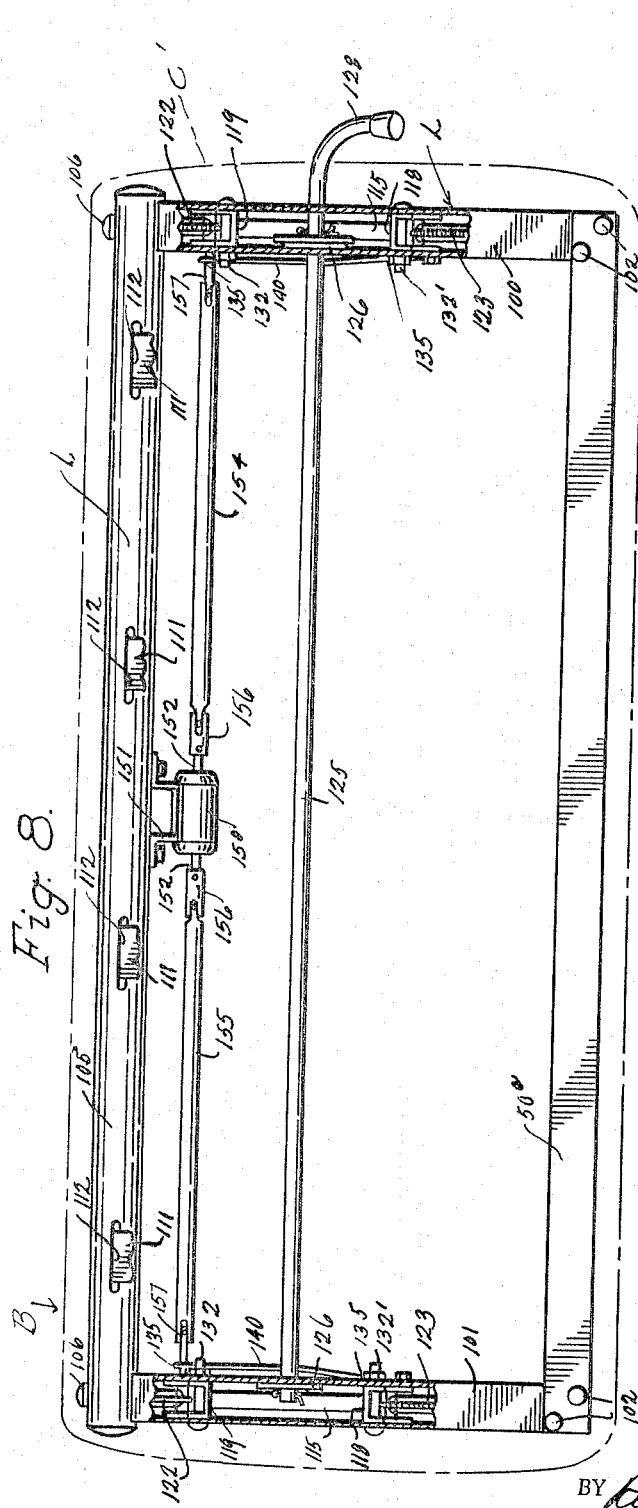
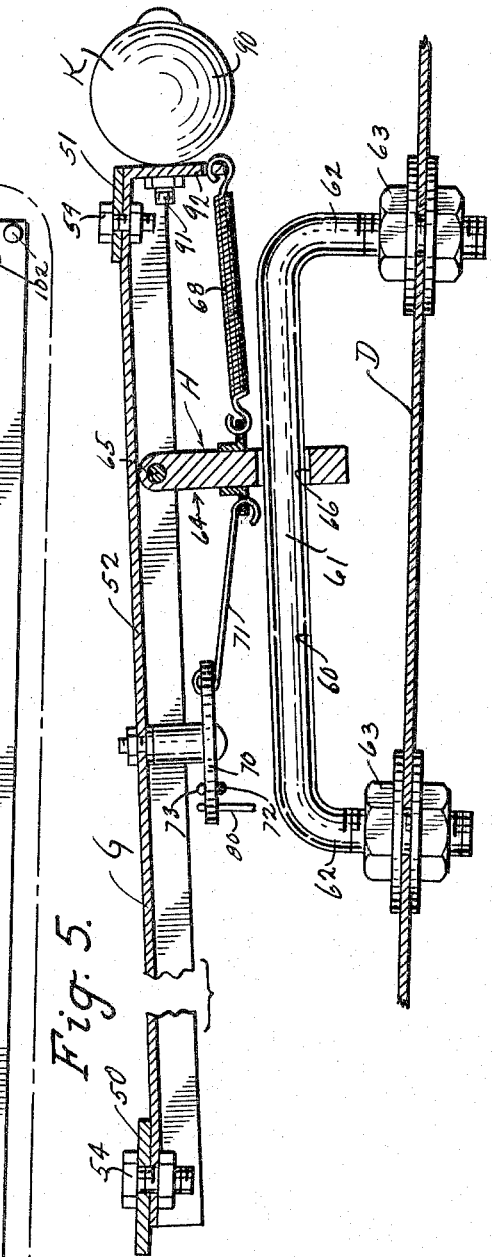
INVENTORS
M. L. CLEVETT JR.
E. W. SMITH
BY Rommel, Allwine & Rommel
ATTORNEYS April 25, 1967 M. L. CLEVETT, JR., ET AL 3,315,935
MOVABLE VEHICLE SEAT CONSTRUCTION, ANCHORING
MEANS AND BELT ASSEMBLY THEREFOR
Filed March 18, 1965 4 Sheets-Sheet 4
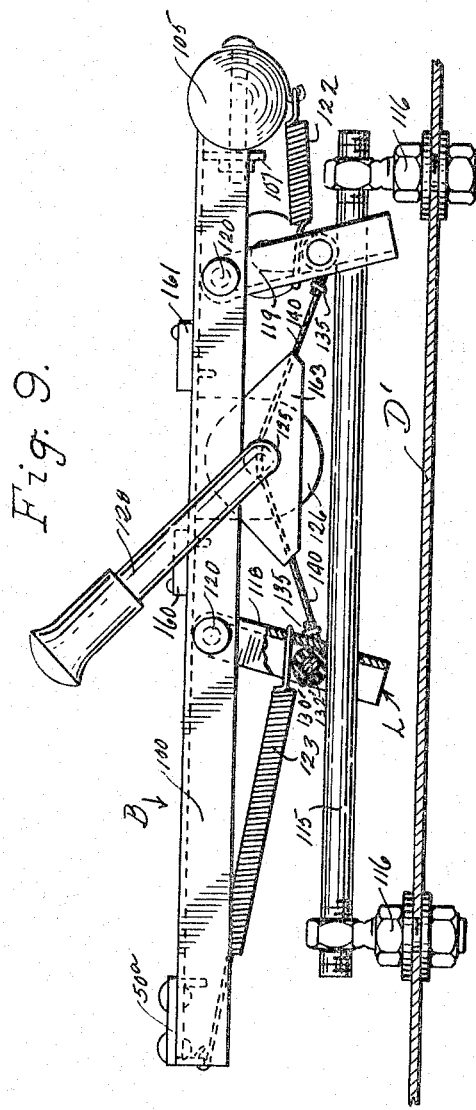
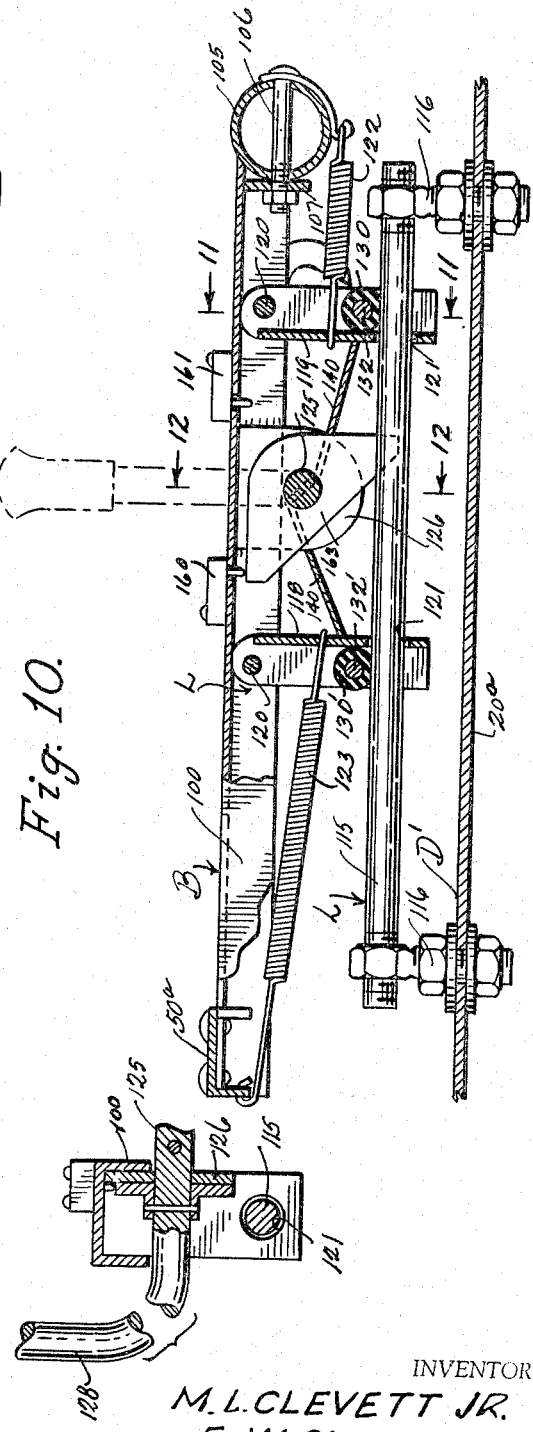
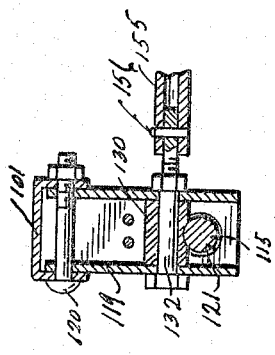
INVENTORS
M. L. CLEVETT JR.
E. W. SMITH
BY Rommel, Allwine and Rommel
ATTORNEYS

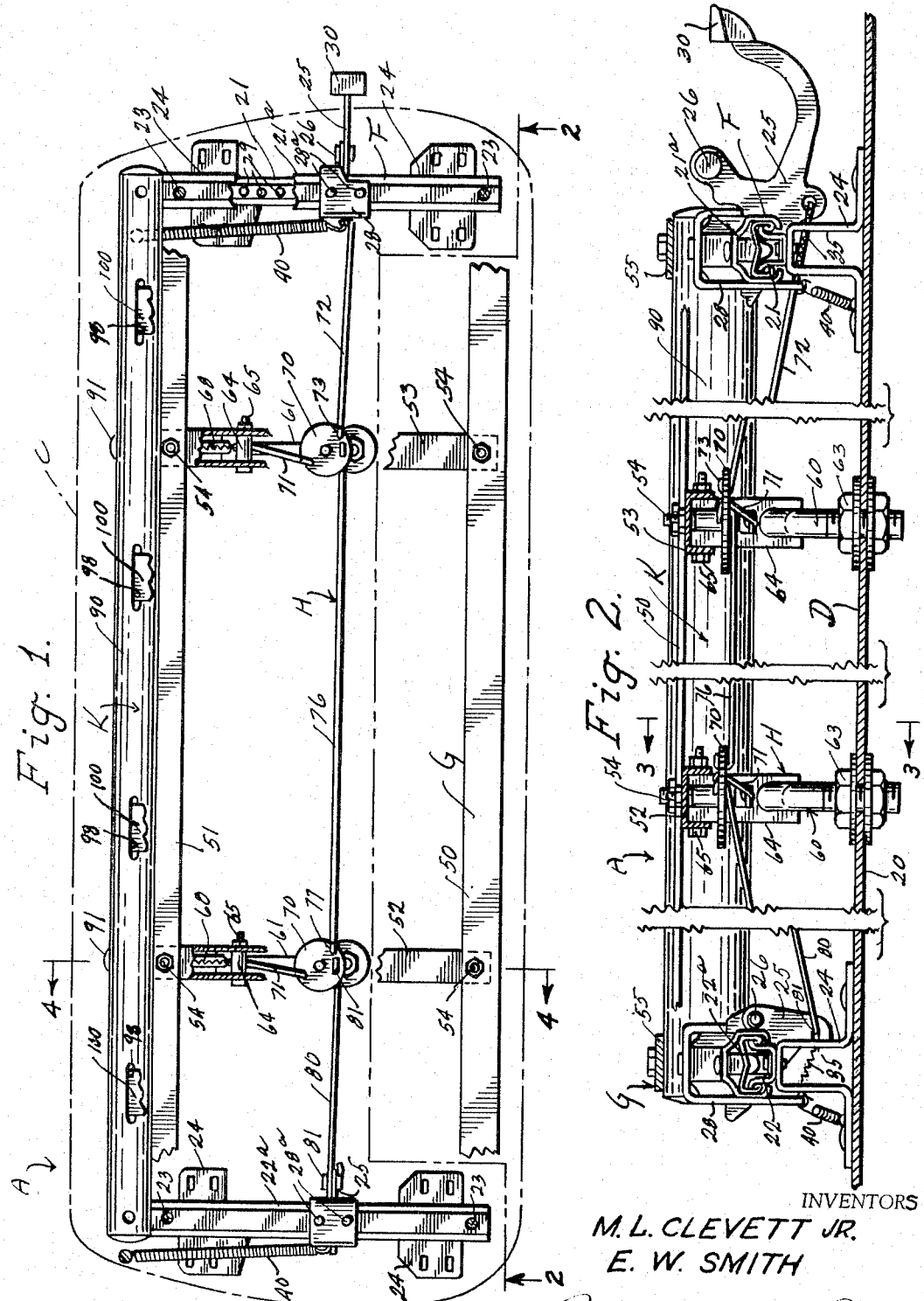
INVENTORS
M. L. CLEVETT JR.
E. W. SMITH
BY Rommel, Alwine and Rommel
ATTORNEYS

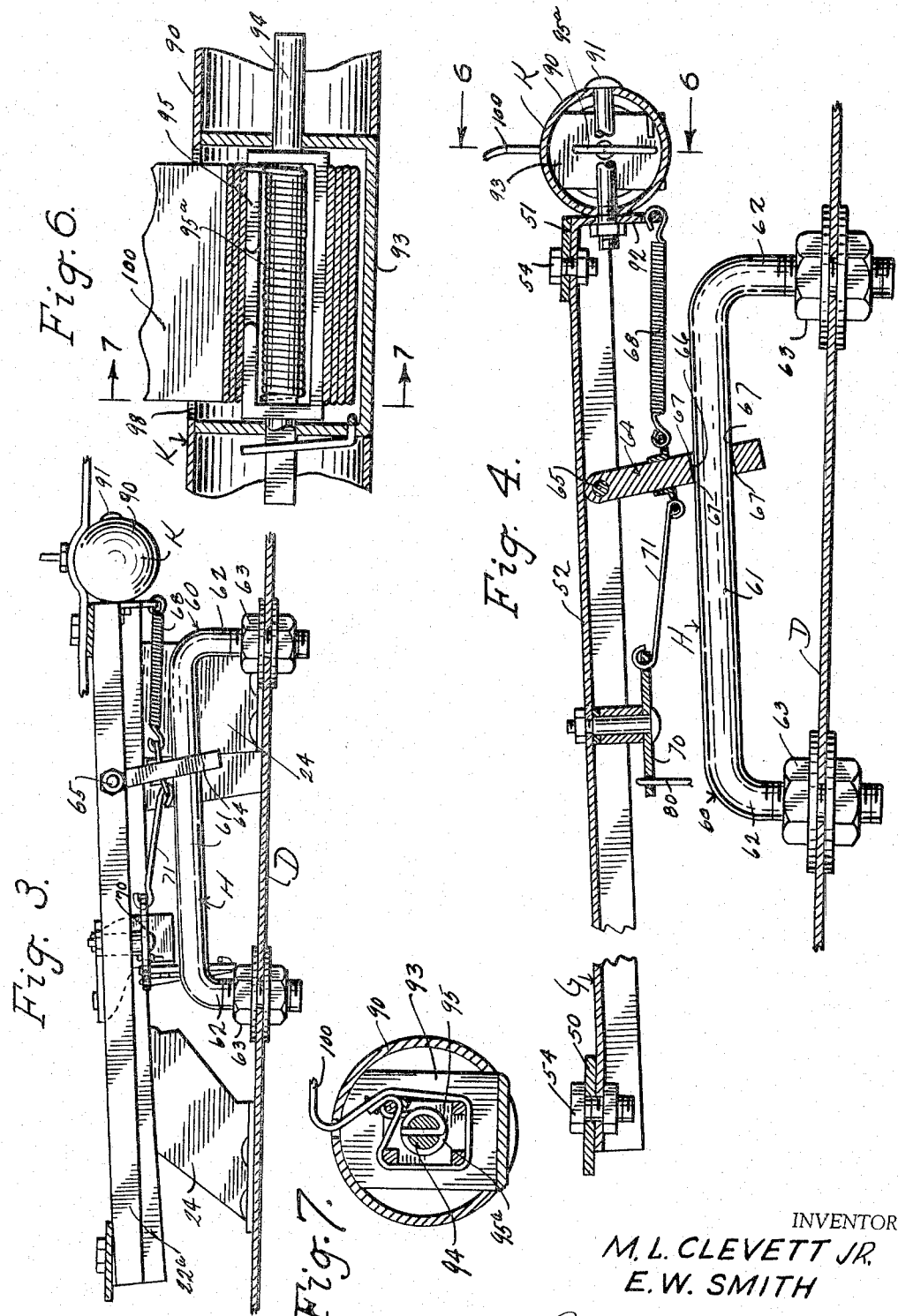

United States Patent Office 3,315,935
Patented Apr. 25, 1967

3,315,935
MOVABLE VEHICLE SEAT CONSTRUCTION, ANCHORING MEANS AND BELT ASSEMBLY THEREFOR
Merton L. Clevett, Jr., Lexington, and Edgar W. Smith, Nicholasville, Ky., assignors to Irving Air Chute Company, Inc., Lexington, Ky., a corporation of New York
Filed Mar. 18, 1965, Ser. No. 440,682
14 Claims. (Cl. 248—429)

This invention relates to improvements in automobile seat constructions and has more particular reference to a seat so constructed and arranged as to lock anchor in any position to which it may be adjusted and to thereby prevent shifting or destruction of the seat as an incident of external force, occurring by way of example, as the result of a crash.

A further object of this invention is the provision of an adjustable automobile vehicle safety seat anchoring system which has means to enable the fore and aft adjustment of the seat and an automatic locking system.

A further object of this invention is the provision of an adjustable vehicle seat anchoring system in which the seat in any adjusted position within its range will be securely anchor locked against liability of forward movement.

A further object of this invention is the provision of a positive locking system for adjustable automobile vehicle seats which will prevent any forward propulsion of the seat as the result of a crash or accident and which has means connected for operation of the locking system to enable the seat to be adjusted fore and aft under manual or power operated control.

A further object of this invention is the provision of an improved belt mounting construction for application to vehicle seats.

A further object of this invention is the provision of an improved safety seat construction for automobiles which embodies an improved anchoring system adapted to positively lock the seat against any forward movement and which includes means for the mounting thereon of a seat belt assemblage entirely within the confines of the seat structure.

A further object of this invention is the provision of a reinforced seat structure for automotive vehicles having associated therewith means for fore and aft adjustment of the same and likewise having associated therewith complementary anchoring means under the control of an operator and independent of seat belt assemblages to maintain the seat in locked position upon the vehicle against forward movement.

A further object of this invention is the provision of an automobile seat structure and belt combination comprising an integrated stressed structure and belt assemblage.

Other objects and advantages of this invention will be apparent during the course of the following detailed description.

In the accompanying drawings, forming a part of this specification, and wherein similar reference characters designate corresponding parts throughout the several views:

FIG. 1 is a top plan view of an automobile seat showing the reinforced seat frame portion thereof, and further showing a track system on which the seat operates for sliding fore and aft; the view showing an improved construction under control of the operator for locking the seat against forward movement, and also embodying an improved belt assemblage.

FIG. 2 is a fragmentary cross sectional view taken through the structure shown in FIG. 1 substantially on the line 2—2 of FIG. 1.

FIG. 3 is a side elevation of the seat structure attached to the floor or frame of a vehicle showing the improved anchoring arrangement in locked position.

FIG. 4 is a cross sectional view of the seat locking construction, being taken substantially on the line 4—4 of FIG. 1 and showing the seat locked against forward movement.

FIG. 5 is a view similar to FIG. 4, but showing the locking means in neutral position under control of the operator, for fore and aft seat sliding and adjusting purposes.

FIG. 6 is a fragmentary cross sectional view showing one form of retractable belt which may be associated as a built-in construction with the seat.

FIG. 7 is a cross sectional view taken substantially on the line 7—7 of FIG. 6.

FIG. 8 is a top plan view of a modified form of invention including an improved and novel means to control fore and aft adjustment of a seat structure and including associated locking means to hold the seat locked; this form of invention also including power actuated means to move the seat structure along its trackway.

FIG. 9 is a cross sectional view of the form of invention shown in FIG. 8, more particularly showing the power actuating means and seat locking means in locked position against fore and aft movements.

FIG. 10 is a view similar to FIG. 9, but with the adjustment lever in position to unlock the seat and permit the power actuating means to move the seat.

FIG. 11 is a fragmentary cross sectional view showing a drive connection for the power actuated means; the view being taken on the line 11—11 of FIG. 10.

FIG. 12 is a fragmentary cross sectional view showing a detail of the operator controlled switch for the power actuator taken on the line 12—12 of FIG. 10.

In the drawings, wherein for the purpose of illustration are shown preferred and modified forms of the invention, the letter A may generally designate the form of invention shown in FIGS. 1 to 7 inclusive. It includes a seat C mounted upon the floor of a car frame D. A track means F is provided for mounting the seat C on the floor of the car frame D. The seat C is provided with seat reinforcement G, and a controllable anchoring system H is provided to automatically lock the seat in adjusted position against any forward movement. An improved belt assemblage K is provided.

In the form of invention B, shown in FIGS. 8 to 12 inclusive, an improved seat C' is provided mounted upon car frame flooring D'. This form includes seat reinforcement, trackway means and an anchoring system L.

Referring to the form of invention A, car frame D for the purposes of this invention consists of a preferably metal floor 20 of adequate strength to withstand transmittal of forces from the seat structure to the frame such as would occur at the time of a crash.

The track means F is conventional and includes tracks 21 and 22 attached at each side of the seat C directly to the floor 20. These tracks 21 and 22 may take any form, preferably being fixedly mounted upon standards 24 secured to the car frame floor 20. The tracks 21 and 22 are apertured at 29 or they may be provided with teeth. The head portions thereof form guides for slidably receiving elongated members 21a and 22a telescoped thereon; said members 21a and 22a being secured by bolt means 23 to the seat frame. Levers 25 are pivoted at 26 on brackets 28 secured to the slidable members 21a and 22a, by rivets 28a. They have detent ends which fit into the sockets 29 of the tracks 21 and 22 in a manner well known in the art to which this invention relates. The levers 25 normally spring urged at 35 into engagement with the trackways 21 and 22 and to a limited extent they prevent fore and aft movement of the seat in sliding relation along the trackways except under abrupt stoppage. Springs 40 are provided for urging the seat to the rear and are connected under tension at their ends to the brackets 28 and car frame.

The levers 25 are both actuated by a handle 30 by means to be subsequently described.

Referring further to the structural arrangement of the seat C, the same includes a reinforced framework G including a front metal frame member or piece 50 and a rear metal member 51 secured to the underside of the seat as shown in FIG. 1. These members run the long way of the seat and they are bolted together at 54 by metal cross members 52 and 53 which may be of channel-shaped cross section. The ends of members 50 and 51 may be bolted to end cross members 55 (see FIG. 2) to form a rectangular framework.

Referring to the controllable anchoring system H, inverted U-shaped bolts or guide rails 60 are provided, each including a straight portion 61 on which an anchor bar slides and legs 62 which may be bolted at 63 to the frame or floor D. These anchor supporting members 60 may be provided in any desired number, usually one or two will suffice. The drawings in the form of invention A show two of them. They are located parallel with and below the open channels of the intermediate cross members 52 and 53.

Anchoring members 64 are pivoted at 65 on the side flanges of the channel shape members 52 and 53, the same having passageway 66 through which the straight portion 61 of the anchoring member 60 extends. The opening 66 is of larger diameter than the cross section of the rail 61 and the edges 67 are sharp, particularly the front top edge for the purpose of biting into the guide beam 61 in order to anchor the seat against movement. These locks 64 are normally spring loaded at 68 for rear movement to locate them in the locking position shown in FIG. 4 so that when in such position the seat cannot have any forward movement.

The controls for the anchoring system H preferably comprise washer type cranks 70 which are rotatably mounted upon the cross members 52 and 53, as shown in FIGS. 4 and 5. They are approximately horizontally positioned. The cranks 70 are linked at 71 to the portions of the locking members 64 above the beam 61 as shown in FIGS. 4 and 5. The manually actuated lever 30 is connected by a link 72 to the closest crank washer 70 at a location 73 remote from the connection 75 of the link 71 so that as the lever 30 is lifted it will rotate the crank washer 70 and through the link 71 move the lock member 64 to a neutral position, such as shown in FIG. 5, and under which circumstance the seat can be manipulated forwardly or rearwardly.

Since there are two locking locations in the form of invention A, a link 76 is pivotally connected at 77 to the crank washer 70 closest to the control lever 30 and extends for connection at 77 to the second crank washer 70. Crank washer 70 most remote from the control lever 30 is provided with a link 80 having a connection at 81 on the crank washer 70 and extends for connection at 81 to the detent 25, as shown in FIG. 2.

It will be apparent from the foregoing that under normal circumstances the seat will be automatically and positively locked by the anchor members 64 in the position shown in FIG. 4 against movement, both fore and aft. However, if it is desired to slide the seat with respect to the anchor member 61 it is necessary to lift the lever 30 and this will swing the lock members 64 to neutral positions, as shown in FIG. 5, and under which circumstances the seat can be moved forwardly or rearwardly. The spring 68 is normally under tension to move the seat rearwardly.

The anchor system above described may be used with or without a seat belt assemblage. However, it is preferred to associate with the seat structure a retractable belt assemblage K. It includes a tubular casing 90 secured at 91 by bolts or other means to depending flanges 92 of the channel members 52 and 53, along the rear margin of the seat. The belt assemblage may include supporting brackets 93 mounted in the tube 90, as shown in FIG. 6. Shafts 94 are supported by brackets 93 upon which spring loaded reels 95 rotate. Each reel has a spring 95$^a$ secured at one end 96 to the reel and at its opposite end 97 to the stationary shaft 94. It is normally loaded for wrapping the belt in coiled relation thereupon. The tube 90 is slotted at 98 for extension of the belt webbing 100 therethrough. The belt webbing will have the usual buckle parts thereupon (not shown). The belts play no part in locking or anchoring the seat upon the rail 61, since the belt itself does not, in any way, control the movement of the lock anchors 64.

It will be noted that the belt assemblage comprises a built-in part of the seat structure and is located in an out-of-the-way position, so that attachment of the same to the floor structure of frame of the car is unnecessary; the seat being stressed as above described so as to take all of the shock incident to a crash and transfer it to the car frame.

In the form of invention B, shown in FIGS. 8 to 12 inclusive, the seat is reinforced in substantially the same manner as in the form of invention A. In form B the conventional trackway system employed in mounting and controlling seat movements is done away with and in lieu thereof the seat is mounted on parallel tracks or anchor bars with an incorporated locking system which locks the seat positively against any movement fore and aft. The locking means may be controlled manually or by power. In the form B, a power control is illustrated and also a manual means to release the anchors to neutrol position when it is desired to move the seat fore or aft.

The frame of form B includes a front metal reinforcing member 50$^a$ and transverse inverted channel-shaped side members 100 and 101 which are riveted in right angled relation at 102 to the ends of the reinforced front member 50$^a$. At its rear the reinforced frame includes a metal tube 105 which is bolted as at 106 to the downwardly extended flanges 107 welded or otherwise secured as part of the cross beams 100 and 101, as shown in FIGS. 9 and 10; the tube 105 thus providing reinforcement for the rectangular shaped reinforced seat frame. The tube 105 is provided with rectractable seat belts 111 extending through slots 112. The belts 111 are operated and constructed in the manner above described for the form of invention A.

As shown in FIGS. 9 and 10, the car floor 20$^a$ is provided at opposite sides of the seat with anchor bars 115 secured at their ends by bolt means 116. These bars serve as a mounting for the seat structure. The cross members or channels 100 are each provided with a pair of relatively spaced anchoring or locking members 118 and 119 pivoted thereon at 120 and depending therefrom. At their lower ends they are apertured at 121 to slidably receive therein the anchor bars 115. The openings 121 are larger in diameter than the locking bar 115, so that in neutral position with the lock members 118 and 119 vertical, as shown in FIG. 10, they will not grip the bar 115, but in angled position they move under the influence of their respective tensioned springs 122 and 123 into angled biting and gripping position with the bars to prevent movement of the seat in either direction. In transverse or horizontal cross section the lock members 118 and 119 are channel shaped. The side walls of lock members 119 support rollers 130, keyed on pintles 132 mounted on said side walls. These rollers 130 are preferably formed of some slightly resilient plastic, such as "Neoprene" and they act to rotatably support the seat in slide position such as shown in FIG. 10 because they preferably project beyond the adjacent edges of the openings 121 as can be seen from FIG. 10. The lock members 118 have rollers 130' rotatably supported on the pintles 132'.

The normal position of the anchor members 118 and 119 is relatively downwardly divergent to bite into the bar 150 and prevent movement of the seat in either direction. The springs 122 and 123 cause the tilted position shown in FIG. 9. These anchor members 118 and 119 are controlled by means of a shaft 125 rotatably supported by brackets 126 hung from the cross members 100 and 101, as shown in FIGS. 8 and 9. The shaft 125 has an operating handle 128 thereon at the normal left hand side of the driver's seat. Each set of anchor members 118 and 119 under each cross member 100 and 101 are drawn to neutral position by means of a flexible cable 140 which is secured to the shaft 125, preferably by being diametrically extended through a passageway through said shaft; the ends of the cables 140 at opposite sides of shaft 125 are secured at locations 135 to the anchor members 118 and 119, as shown in FIG. 9. In order to move the anchor members into neutral position it is merely necessary for the operator to move the lever 128 to the vertical position shown in FIG. 10. This winds the cables 140 on shaft 125 and shortens the lengths thereof, thus pulling the anchor members 118 and 119 into the neutral position shown in FIG. 10. The chair seat can now be moved backward or forward upon the anchor bars 115.

The system L includes power mechanism controlled through rotation of the shaft 125. It includes a reversible gear motor 150 mounted at 151 on the reinforcing tube 105. It has a shaft 152 extending outwardly from each end. Connecting shafts 154 and 155 are connected by universal joints 156 to the opposite ends of the shaft 152 and the remote ends of shafts 154 and 155 are connected by universal joints 157 to the stub ends of the pintles 132 of the anchor members 119. Thus, when the anchor members 118 or 119 are in neutral position the rollers 130 will frictionally engage the anchor bars 115 and under the influence of rotation of the motor shaft will move the seat forward or rearward.

The switch control for the motor 150 comprises microswitches 160 and 161 which respectively move the seat rearwardly and forwardly. A switch arm structure 163 connected to and rotatable with the shaft 125 operates the switches 160 and 161 for controlling rotation of the motor for rearward and forward driving. The position shown in FIG. 10 shows rearward drive of the motor for rear movement of the seat through the power actuated means shown.

It will be apparent from the foregoing that in the forms of invention herein shown and described there has been presented a fully stressed car seat with compact mounting of a safety positive locking means in combination with a belt structure which is independent thereof but compactly arranged with respect thereto.

Various changes in the size, shape and arrangement of parts may be made to the forms of invention herein shown and described without departing from the spirit of the invention or scope of the claims.

We claim:

1. In a device for use in a vehicle having a fore and aft movable seat and a vehicle frame floor, trackway means mounted on the floor, bracket means mounted on the seat slidable fore and aft on the trackway means, control means for releasably connecting the trackway means to the seat bracket means movable thereon whereby to normally fix the position of the seat against movement fore and aft, an elongated anchoring bar mounted on said floor beneath the seat, a lock member movably mounted on said seat having a releasable positive locked position with respect to said bar, and means to release the lock member from its locked relation with the bar.

2. In a device for use in a vehicle having a fore and aft movable seat and a vehicle frame floor, reinforced frame means mounted on the bottom of the vehicle seat, a plurality of relatively spaced elongated guides secured to the floor paralleling the movement of the seat, spaced supporting means mounted on the reinforced frame of said seat for movement along said guides, a plurality of pivoted lock members mounted on the reinforced frame of said seat having openings therein for slidably receiving the guides therein, and a single means to simultaneously control the position of the plurality of lock members whereby they can be placed in neutral position to move the seat fore and aft upon said guides, or normally and simultaneously position said lock members into anchored biting relation upon said guides to prevent movement of the seat along said guides.

3. In a device for positive locking of an automobile seat against fore and aft movements, the combination with a vehicle frame and a fore and aft movable seat, means on the frame for mounting the seat thereon for fore and aft movements, a plurality of guide members mounted on said car frame in spaced relation along the seat and paralleling the fore and aft movement of the seat, lock members pivotally mounted on said seat having openings through which the guide members extend, the openings being larger than the cross dimensions of the guide members whereby in a neutral position of the lock members the seat and its lock members can slide along said guide members, spring biasing means connected to said seat normally urging said lock members into biting locked position upon the guide members, and control means for simultaneously moving said lock members to a neutral position for sliding action of the seat.

4. The device described in claim 3 in which the last mentioned means comprises a rotatable means mounted on the seat for each of said lock members, means connecting said rotatable means to the lock means so that upon rotation of the rotatable means the lock members will be moved between neutral and locking positions, and means connecting said rotatable members for simultaneous rotation.

5. In a device for use in a vehicle having a fore and aft movable seat and a vehicle frame floor, the combination of metal reinforcing members on the bottom of the seat at the fore portion thereof and at the rear portion thereof paralleling the length of the seat, and side metal reinforcing members mounted on the seat connected to the ends of said first mentioned reinforcing members, track means mounted on said side reinforcing members and floor for movement of the seat fore and aft, reinforcing metal cross members connected to the front and rear metal cross members located intermediate the side reinforcing metal members, relatively spaced elongated guide members mounted on the car floor beneath said intermediate cross members, lock members pivoted on said cross members having openings for receiving the guide members therein, the guide members openings being larger than the cross dimension of said elongated guide members to permit tilting movement of the lock members with respect to said guide members, biasing means normally urging said lock members to a locking biting engagement with the respective guide members to prevent seat movement, and means to simultaneously move all of the lock members to neutral positions out of locking relation with said guide members.

6. A device as described in claim 5 in which a tube is connected to the rear ends of said side metal members, and retractable belt means mounted in said tube.

7. In a device for use in a vehicle having a fore and aft movable seat and a vehicle frame floor, the combination of elongated guide members mounted on the floor in secured relation thereon, said seat having members mounted on the bottom thereof above said guide members, a lock member pivoted on each of said side members having an opening therein receiving the guide member respectively associated therewith, means mounted on said lock members for supporting the seat upon said guide members so the seat may bear upon and move along said guide members, means normally biasing the lock members to lock upon said guide members and prevent movement of the seat with respect to said guide members, and means to position said lock members in neutral position in counter-relation to the biasing means for travel of the seat along said guide members.

8. The device described in claim 7 in which the seat supporting means of lock members which bear on the guide members is rotatable, and power means connected with said rotatable seat supporting means to rotate the same for the travel of the seat along said guide members.

9. The device described in claim 7 in which two lock members are provided on each side member of the seat for each of said guide members normally sloped in relatively divergent relation, and operating means for simultaneously tilting said lock members of each guide member into locking position or into neutral position.

10. In an anchoring device for use in a vehicle having a fore and aft movable seat and a vehicle frame floor, the combination of elongated guide members mounted on said floor located in parallelism with the fore and aft movement of the seat, locking members mounted on the seat having means supporting the same on said elongated guide members for movement therealong, means to electrically power actuate and support movement of the seat along said guide members, biasing means normally tending to move said lock members into locked position upon said guide members to prevent fore and aft movements of the seat, control means to move said lock members into neutral or locking positions, and switch means operated by the last mentioned means to operate the power means for forward and rearward movement of the seat.

11. In a supporting and locking device for use of a vehicle having a fore and aft movable seat and a vehicle frame, the combination of a plurality of relatively spaced elongated guide members mounted on the floor and secured thereto, lock members pivoted on said seat for each of said guide members, each of the lock members having an opening therein receiving the guide member respectively associated therewith, means mounted on said lock members for normally supporting the seat for movement along the guide members, means normally biasing the lock members to lock upon said guide members and prevent movement of the seat along said guide members, and means to position the said lock members in neutral position in counter relation to the biasing means for travel of the seat supporting means of said lock members along said guide members.

12. The device described in claim 11 in which a plurality of the lock members are provided for each of said elongated guide members normally positioned in divergence with respect to each other when locking upon said guide members.

13. The device described in claim 12 in which there is provided between said lock members means for relative movement of the lock members to decrease the relative divergent angle thereof and out of locking relation with said guide members.

14. The device described in claim 13 in which the means mounted on said lock members for supporting the seat comprises rollers, and power means to rotate the rollers.

References Cited by the Examiner

UNITED STATES PATENTS

| | | | |
|---|---|---|---|
| 2,905,231 | 9/1959 | Olson | 297—388 |
| 2,964,093 | 12/1960 | Lohr et al. | 248—429 |
| 3,079,726 | 3/1963 | May | 108—10 |
| 3,138,405 | 6/1964 | Hanway | 297—388 |
| 3,188,045 | 6/1965 | Fowler et al. | 248—429 |
| 3,204,916 | 9/1965 | Pickles | 248—429 |
| 3,207,554 | 9/1965 | Dall | 297—385 |
| 3,215,220 | 11/1965 | Schoefler | 297—385 X |
| 3,220,690 | 11/1965 | Caughey | 248—430 |
| 3,248,149 | 4/1966 | Carter | 297—388 |

FOREIGN PATENTS 760,672   3/1954   Germany.

CASMIR A. NUNBERG, *Primary Examiner.*